United States Patent
Vitaldevara et al.

(10) Patent No.: US 9,596,201 B2
(45) Date of Patent: *Mar. 14, 2017

(54) IDENTIFYING FIRST CONTACT UNSOLICITED COMMUNICATIONS

(71) Applicant: Microsoft Corporation, Redmond, WA (US)

(72) Inventors: Krishna Vitaldevara, Woodinville, WA (US); Jason Walter, Woodinville, WA (US); Vasantha K. Vemula, Fremont, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 69 days.

This patent is subject to a terminal disclaimer.

(21) Appl. No.: 14/176,075

(22) Filed: Feb. 8, 2014

(65) Prior Publication Data

US 2014/0156776 A1    Jun. 5, 2014

Related U.S. Application Data

(63) Continuation of application No. 13/251,300, filed on Oct. 3, 2011, now Pat. No. 8,682,990.

(51) Int. Cl.
*G06F 15/16* (2006.01)
*H04L 12/58* (2006.01)
*G06Q 10/10* (2012.01)

(52) U.S. Cl.
CPC ........... *H04L 51/12* (2013.01); *G06Q 10/107* (2013.01)

(58) Field of Classification Search
CPC .................. H04L 51/12; G06Q 10/107
USPC ........ 709/204, 206, 217, 219, 223, 224, 250
See application file for complete search history.

(56) References Cited

U.S. PATENT DOCUMENTS

| | | | |
|---|---|---|---|
| 6,687,362 B1 | 2/2004 | Lindquist | |
| 7,228,335 B2 | 6/2007 | Caughey | |
| 7,539,699 B2 | 5/2009 | Kobashikawa | |
| 7,558,832 B2 | 7/2009 | Rounthwaite | |
| 7,562,122 B2 | 7/2009 | Oliver | |
| 7,945,674 B2 * | 5/2011 | Appelman | 709/227 |
| 8,103,727 B2 * | 1/2012 | Lin | H04L 12/585 |
| | | | 709/201 |
| 8,141,152 B1 * | 3/2012 | Hwang et al. | 726/22 |

(Continued)

OTHER PUBLICATIONS

Thorkildssen, "SPAM—Different Approaches to Fighting Unsolicited Commercial Email, A survey of spam and spam countermeasures", Proceedings of Network and System Administration Research Surveys, 2004, pp. 45-55.

(Continued)

*Primary Examiner* — Viet Vu

(74) *Attorney, Agent, or Firm* — Tom Wong; Anand Gupta; Micky Minhas

(57) ABSTRACT

Techniques involving identification of electronic messages that are the first contact between the sender identification and addressed recipients. One representative technique includes identifying electronic messages originating from a sender that are first contact electronic messages between the sender and targeted recipients. The sender of the electronic messages may be designated as a source of unsolicited messages if heuristics involving the first contact electronic messages indicate a distribution of unsolicited messages by the sender.

20 Claims, 6 Drawing Sheets

(56) References Cited

U.S. PATENT DOCUMENTS

| 8,170,588 | B2 | 5/2012 | Tamchina |
| 8,312,085 | B2 | 11/2012 | van Riel |
| 2007/0088789 | A1 | 4/2007 | Berman |
| 2007/0143469 | A1 | 6/2007 | Adams |
| 2009/0187987 | A1 | 7/2009 | Ramarao |
| 2009/0307771 | A1 | 12/2009 | Rajan |
| 2010/0100564 | A1 | 4/2010 | Brewer |
| 2011/0035451 | A1 | 2/2011 | Smith |

OTHER PUBLICATIONS

Hunt, "Current and new developments in spam filtering", 14th IEEE International Conference on Networks, Sep. 2006, pp. 6.

"Geo-Data Spam Filter", U.S. Appl. No. 13/084,132, filed Apr. 11, 2011, pp. 43.

U.S. Appl. No. 13/251,300, filed Oct. 3, 2011, Vitaldevara.

* cited by examiner

IDENTIFYING FIRST CONTACT UNSOLICITED COMMUNICATIONS

RELATED APPLICATION

This Application is a Continuation of and claims benefit from U.S. Pat. No. 8,682,990 that was issued on Mar. 25, 2014, and that is incorporated herein by reference in its entirety.

BACKGROUND

Desktop computing devices, laptop and other portable computers, smartphones and other hand-held devices, and other electronic devices are typically equipped to receive electronic communications, such as electronic mail (e.g. "email"), text messages, or the like. With the advent of large scale wireless and wireline networks, and a cornucopia of such electronic communication devices in use over the globe, reaching other people has never been easier. Email has become one of the best mediums for individuals, companies, advertisers or other entities to locate a desired audience for advertisement and solicitations. However, it is often the case that the targeted recipients of such communications did not solicit, nor do they want to receive, communications from such entities. The indiscriminate distribution of such electronic communications is colloquially referred to as junk email, "spam," unsolicited bulk email, etc.

Email providers, such as web-based email providers, attempt to manage such unsolicited email on behalf of their registered users. Local email clients may also include software to attempt to identify and filter unwanted email messages. Identifying and properly filtering unsolicited email and other electronic messages has proven to be a substantial task, as the sources of unsolicited email continue to seek ways to make their communications look legitimate, or at least to make them difficult to identify as illegitimate.

SUMMARY

Techniques involving identification of electronic messages that are the first contact between the sender identification and addressed recipients. One representative technique includes identifying electronic messages originating from a sender that are first contact electronic messages between the sender and targeted recipients. The sender of the electronic messages may be designated as a source of unsolicited messages if heuristics involving the first contact electronic messages indicate a distribution of unsolicited messages by the sender.

Another representative technique includes determining a ratio of electronic messages addressed to first contact targeted recipients to a total number of the electronic messages identified as being sent by the sender. If the ratio exceeds a threshold, the sender of the electronic messages is designated as a source of unsolicited messages.

Another embodiment is directed to an apparatus that includes a processor. A first contact determination module includes instructions executable by the processor that are configured to determine whether an email is a first contact between the email sender and a targeted recipient. A calculation module includes instructions executable by the processor that are configured to calculate a value representative of a quantity of the first contact emails relative to a reference number of emails recognized as being sent by the sender. A compare module includes instructions executable by the processor that are configured to compare the calculated value to a threshold to determine whether the sender will be regarded as a source of unsolicited bulk email.

One embodiment includes one or more computer-readable media having instructions stored thereon that are executable by a processor. The executable instructions perform various functions, including maintaining a count of a total number of emails sent by a sender and addressed to targeted recipients. Additionally, a respective record of identifiers involved in email communication with each of the targeted recipients is maintained. It is determine whether the sender has previously communicated with each of the targeted recipients based on a comparison of the respective record of identifiers and an identifier of the sender. The functions further include maintaining a count of a number of emails sent to the targeted recipients that represent a first contact between the sender and the respective targeted recipients. A ratio of the count of the number emails sent to the targeted recipients that represent a first contact and the count of the total number of emails addressed to the targeted recipients is derived. The ratio is compared to a threshold value, and further emails from the sender to the targeted recipients are restricted if the ratio exceeds the threshold value.

In particular embodiments of the functions performed by such executable instructions, the instructions may further establish the threshold value based on at least a category of the sender identified from one or more addresses used by the sender.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
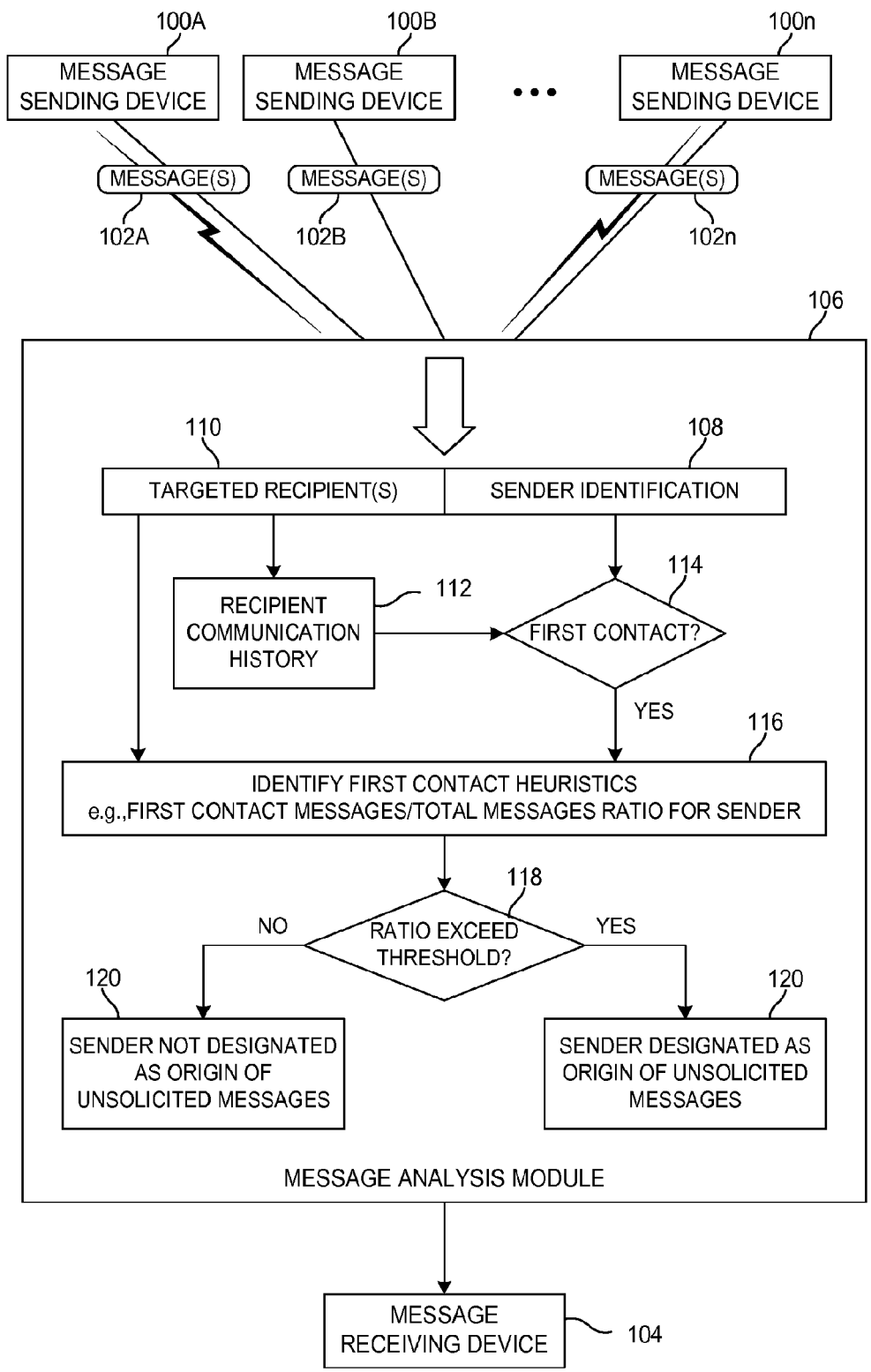
FIG. 1 is a diagram generally illustrating a representative manner for identifying and acting on first contact unsolicited messages.

In the following description, reference is made to the accompanying drawings that depict representative implementation examples. It is to be understood that other embodiments and implementations may be utilized, as structural and/or operational changes may be made without departing from the scope of the disclosure.

The disclosure is generally directed to identifying sources of unsolicited electronic messages. In the context of email, senders can distribute commercial or other unsolicited emails to any addressee. As such unsolicited emails are often sent to addresses of email recipients unknown to the sender, the disclosure involves identifying those senders who send some sufficient quantity of "first contact" emails relative to all emails sent by those senders to recipients tracked by the system. Upon identifying such senders, action can be taken to mitigate further targeting of the recipients tracked by the system.

More particularly, a wide variety of electronic devices are capable of receiving electronic communications. These devices range from desktop and portable computers, mobile phones, onboard systems in transportation vehicles, appliances, etc. Sources of unsolicited emails and other electronic communications consequently have an extremely large number of addressable recipients that can be targeted. However, it is often the case that the targeted recipients of such communications did not solicit, nor do they want to receive, such unsolicited communications.

Email systems, whether remote mail servers and other mail transfer agents, and/or local email clients, may attempt to manage such unsolicited email. Web-based email providers strive to mitigate such communications on behalf of their registered users. As noted above, identifying and properly filtering unsolicited electronic messages has proven to be a substantial task, as the sources of such communications continue to seek ways to make their email look legitimate, or at least to make their email difficult to identify as illegitimate.

In some cases, the senders of unsolicited email "spoof" the sender to make it look as though it is a first contact between the sender and targeted recipients. Thus, where junk email filters may have already blocked a particular sender, a dodgy sender may distribute further emails with new sender information, thereby mimicking a first contact in an attempt to evade the junk email filters. Attempts to stop first contact email could result in a large number of false positives, where legitimate senders could be blocked and/or legitimate emails could be blocked or designated as junk/spam. Distinguishing between a legitimate sender and a first contact "spammer" can be difficult at a system level or user level.

To address these and other problems, the disclosure provides solutions for at least identifying sources of unsolicited electronic messages, and in some cases taking action to mitigate receipt by targeted recipients of further indiscriminately distributed communications. As described herein, illegitimate message communications may be identified based on the nature of the relationship between message senders and their targeted receivers. With such information, the email or other electronic messages may be blocked, moved, or otherwise managed to mitigate the negative impact on the targeted recipients.

Thus, among other things, techniques described in the disclosure involve identification of electronic messages that are the first contact between the sender identification and addressed recipients. One representative technique includes determining a ratio of electronic messages addressed to first contact targeted recipients to a total number of the electronic messages identified as being sent by the sender. If the ratio exceeds a threshold, the sender of the electronic messages is designated as a source of unsolicited messages.

Various embodiments below relate to electronic messages such as email, instant messaging, short message service (SMS) or other text messages, and the like. The principles described herein are applicable to any electronic messaging technology. Representative examples described herein may reference any one or more of these electronic messaging technologies, yet the principles are applicable to other messaging types unless noted otherwise. Thus, while embodiments may be described in terms of electronic mail or "email," the operational and structural features described, herein are not limited to only this type of electronic communication.

Further, reference is made herein to communicated messages, which may include unsolicited electronic email or messages. Electronic mail that is not solicited, by a recipient may be referred to herein in various ways, such as unsolicited email, unsolicited bulk email (UBE), junk email, "spam," etc. Reference to any particular one(s) of these and/or other terms is not intended to limit the description to any particular phraseology, or to possible definitional differences of one term/phrase relative to another unless otherwise noted. It should also be noted that the description herein can also be applied to solicited or seemingly solicited email as well, although representative embodiments described herein relate to email or other messages that are unsolicited by the targeted recipients.

FIG. 1 is a diagram generally illustrating a representative manner for identifying and acting on first contact unsolicited messages. There may be any number of message sending devices 100A, 100B, 100n, etc. These sending devices 100A, 100B, 100n may represent, for example, desktop computing devices, portable or "laptop" computing devices, server computing devices, smartphones and other mobile communication devices, or any other electronic device capable of communicating electronic messages over wires and/or over-the-air (OTA).

Determining who or what represents a "sender" may be accomplished in various manners. For example, a sender may be identified by what is listed in the "from" address field of an email or other message. In another embodiment, the domain of the sender's address may be used to identify the sender. An identification of a registered entity in the sender's address can be used to identify the sender, such as autonomous system (ASN) prefixes, WHOIS protocol, etc. The sender's internet protocol (IP) address may be used to identify the sender, as may a range of IP addresses. For example, classless inter-domain routing (CIDR) addresses/prefixes may be used to identify a sender in a range of addresses. Email header information or other metadata may identify a sender, or contribute to the identification of a sender. Any one or more of these representative sender identification attributes, and/or other sender identification attributes, may be used to identify the sender.

Such devices 100A, 100B, 100n may send messages 102A, 102B, 102n addressed to targeted recipients of the messages utilizing one or more message receiving devices 104. The messages 102A, 102B, 102n represent any type of electronic message, including but not limited to electronic mail (email), text messages, instant messaging messages and/or other forms of addressable electronic communications. While many messages 102A, 102B, 102n are welcomed by a user(s) of the message receiving device(s) 104, in many cases the messages are unsolicited. Such messages are colloquially referred to as "junk mail," "spam" "unsolicited bulk mail," "unsolicited messages," or other similarly suggestive terms in the electronic communications area.

In an effort to reduce the amount of such unsolicited messages, the disclosure describes techniques for recognizing certain communications as unsolicited based at least on the nature of the relationship between message senders and their targeted receivers. In one embodiment, a message analysis module 106 may determine that a sufficiently high number of electronic messages sent by a sender (e.g. message sending device 100A), relative to all electronic messages sent by that sender, are directed to recipients that the sender has not previously communicated with. If such a determination is made, in one embodiment it is presumed that the sender is distributing unsolicited messages to recipients to which no preexisting relationship exists. A large ratio of such "first contact" messages originating from a sender may be viewed as evidence of that sender being a source of spam or other unsolicited messages. Even where a "spammer" continually changes the name in the "from" field or other identification of the originator to avoid other spam filters looking for repeat offenders, the techniques described herein can identify that sender as a "spammer," as the targeted recipients will appear as first contacts with respect to the new originator name.

Messages are often directed to targeted recipients by way of an intermediary server(s). For example, a mail server may accept email directed to the message receiving device 104, and make that email available to the message receiving device 104. The representative functions of the message analysis module 106 may be implemented anywhere along the path of the communicated messages. For example, functions depicted in the representative message analysis module 106 may be implemented at a message serving apparatus such as a mail server, message proxy or other intermediary device logically in the path from a message sending device 100A to the message receiving device 104. One or more of the illustrated functions of the message analysis module 106 and/or other functions for identifying unsolicited message sources as described herein may also be implemented, for example, at the message receiving device 104 itself. Thus, while the representative message analysis module 106 is depicted as a distinct module for purposes of example, it does not suggest that it could not be integrated with other devices in the path of the messages.

As noted above, the representative message analysis module 106 enables senders of a sufficiently high ratio of first contact messages to be identified. As messages are received at the message analysis module 106, information from the messages may be used in the analysis to determine whether a sender is communicating unsolicited messages. For example, in the case of email and other electronic messages, a communicated message 102A may identify the sender, as depicted by the sender identification 108. The sender may be identified in numerous manners, such as by a "from" field, interact protocol (IP) address, associated domain, and the like. The message 102A may also identify one or more targeted recipients 110 of the message, which in one embodiment includes an address of each targeted recipient 110.

The illustrated message analysis module 106 illustrates a general embodiment in which it can be determined, using at least the sender identification 108 and targeted recipients 110, whether the sender is presumed to be an originator of unsolicited messages. In one embodiment, each of the targeted recipients of each message 102A originating from a sender identified by the sender identification(s) 108 is stored. Stated differently, in one embodiment, for each sender identified by a sender identification 108, each of the recipients 110 that the sender has tried to communicate with is stored, such as in a database or other storage.

Information may also be stored for each recipient, such as depicted by the recipient communication history 112. This communication history 112 can maintain the identifications of the communicating people/entities to which each recipient has directed a message to or received a message from. For example, the recipient communication history 112 may represent a database of the incoming and outgoing communications for each message recipient tracked by the message analysis module 106. In one example, the message analysis module 106 is used in conjunction with a mail server(s) or other mail transfer agent(s). In such cases, the recipient communication history 112 may track the names, addresses or other identifiers of those directing messages to, or receiving messages from, the device users communicating by way of that mail server(s). As described below, the persons/entities in the communication history 112 for each person communicating via the message analysis module 106 may also be referred to herein as the "people I communicate with," or PICW.

For a particular sender identified by the sender identification 108, it can be determined at block 114 whether the targeted recipient 110 of the message 102A is the first contact with the respective targeted recipient. For example, where the recipient communication history 112 does not show any prior communication with the sender identified by the sender identification 108, it may be determined to be a "first contact" by that sender to that targeted recipient. Stated alternatively, if the sender is not part of the targeted recipient's previously-established PICW, it is deemed a first contact in one embodiment.

First contacts by a sender to a targeted recipient are normal in many cases, as there will be a first time in which a particular recipient will be sent an electronic communication by a particular sender. However, where a sender is sending a large percentage of first contact email or other messages, it is indicative of the distribution of unsolicited messages. Heuristics involving the first contact electronic messages can provide a indication of whether a sender is distributing spam or other junk messages. For example, one representative case may involve targeted message recipients receiving what is considered to be a typical quantity of first contact emails for some period of time where an abrupt change to that quantity of first contact emails may be indicative of a distribution of unsolicited messages by some sender(s). In other examples, the quantity of first contact messages relative to some reference value, whether a fixed or contingent reference value, can identify message senders as sources of unsolicited messages. Thus, as shown at block 116, first contact heuristics may be identified. If such heuristics are indicative of a sender distributing spam or other unsolicited messages, the sender can be designated as an origin of unsolicited messages as depicted at block 120.

In one representative embodiment, for each sender identified by the sender identification 108, the heuristics involve identifying a ratio of the first contact messages relative to the total messages sent by that respective sender. Block 116 depicts such an embodiment. For example, the total number of recipients 110 targeted by the particular sender identification 108 can be tracked as the "reference," as can the number of first contacts determined at block 114. The number of first contacts can be compared to the total number, of recipients 110 targeted by that sender. Where the identified ratio of first contact messages to the total messages sent by the sender reaches a threshold as determined at block 118, that sender may be designated as an origin of unsolicited messages (e.g. a "spammer") as shown at block 120. Otherwise, if the ratio does not exceed the threshold, block 120 shows that the sender will not be designated as the origin of unsolicited messages.

As described in greater detail below, the threshold may be a static value, or may be dynamic in that it may change based on other factors. For example, a higher tolerance (e.g., a higher ratio of first contact messages relative to the total messages sent) may be afforded to senders associated with a well-known address domain. Alternatively, in another example, a lower tolerance may be afforded to senders associated with an unknown address domain. Thus, it should be recognized that the "threshold" described herein may be established in any desired manner, including but not limited to the exemplary manners described herein.

Figure 2:
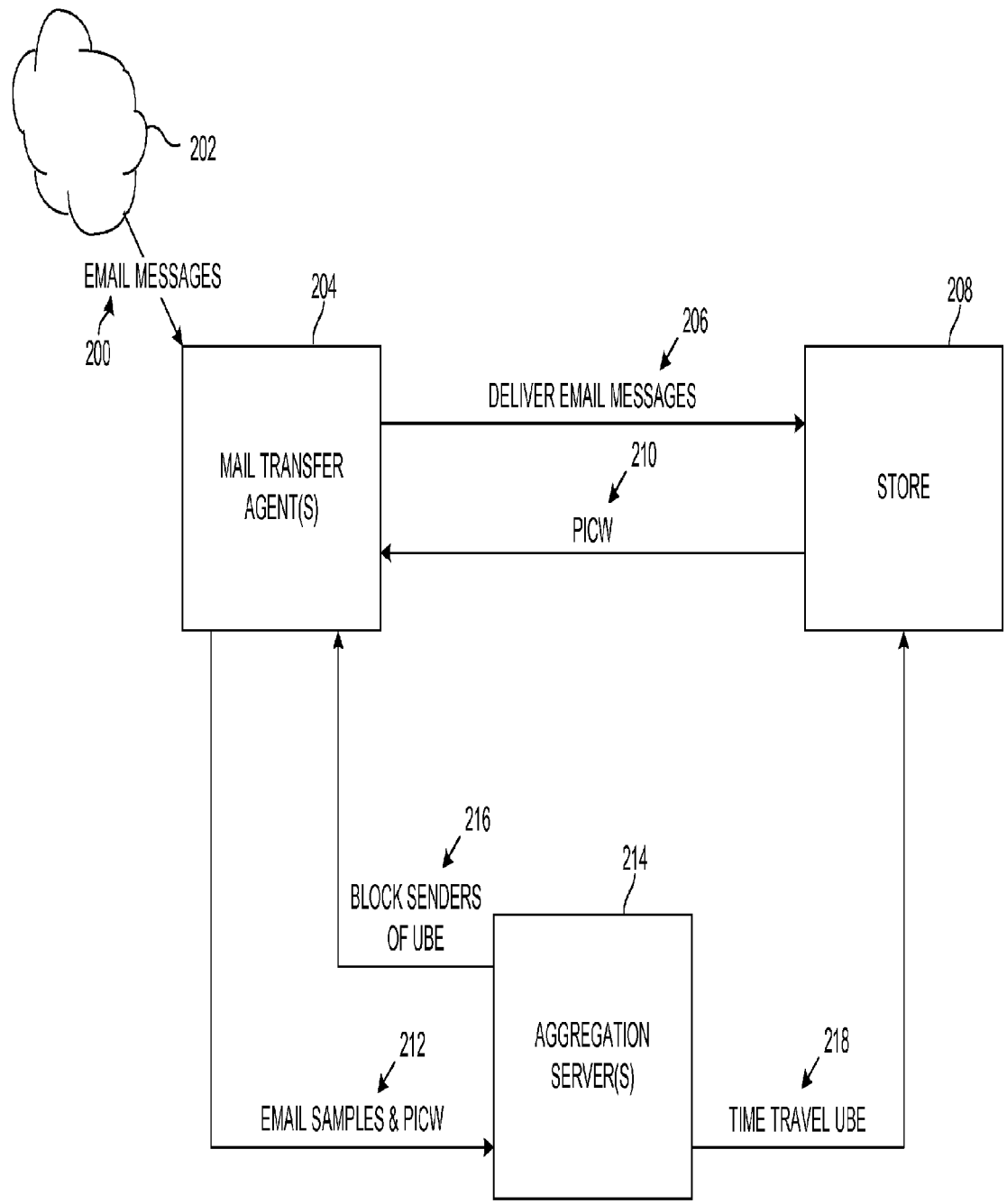
FIG. 2 is a block diagram of a representative system environment in which the principles described herein may be implemented.

FIG. 2 is a block diagram of a representative system environment in which the principles described herein may be implemented. While the example of FIG. 2 is described in terms of email, the principles are analogously applicable to other electronic messages. Email messages 200 are received via a wireless and/or wireline network 202 at one or more mail transfer agents 204, such as one or more mail servers. The email messages 206 may be delivered to the email store 208 which serves as backend storage for emails. The store 208 may also store other data for each email user associated with the system, such as the PICW information 210. In one embodiment, the PICW information 210 represents contact information of those already having been communicated with by each respective user (and potential targeted recipient) served by the mail transfer agent 204.

For each sender of email messages 200, the mail transfer agent 204 can provide email samples and PICW 212. For example, the email samples may include any or all of the emails stored in the store 208, or may include a subset such as at least a list or other representation of the recipients targeted by a particular sender of the email messages 200. With a targeted recipient list for each sender, and the PICW information 210 ultimately provided to an aggregation server(s) 214, the aggregation server 214 can perform functions to identify whether each respective sender is sending unsolicited emails based on at least a first contact ratio. For example, in the example of FIG. 2, the aggregation server(s) 214 can record the recipients targeted by each sender, can record the PICW information for each recipient/user served by the mail transfer agent 204, and in response to this information can determine whether each targeted recipient is a first contact of that sender. The aggregation server 214 can determine the number of first contact emails sent by each sender relative to a total number of emails sent by each respective sender, and if the ratio is above a threshold, can designate the respective sender as an origin of unsolicited messages (e.g. a "spammer") or otherwise take action concerning that respective sender.

Various actions may be taken in response to a sender being designated as an origin of unsolicited messages. In one representative example, the aggregation server 214 can notify the mail transfer agent(s) 204 to block senders from sending further unsolicited email to recipients/users served by the mail transfer agent(s) 204. Such an example is depicted in FIG. 2 by providing a block senders of unsolicited bulk email (UBE) notification 216 to the mail transfer agent 204.

In another exemplary action that may be taken, the mail sent by the sender designated as an origin of unsolicited email may be "time traveled" as depicted by the time travel UBE notification 218. As used herein, time traveling email generally refers to recognizing certain mail as spam or otherwise unsolicited after it has been added to a user's inbox, and in response thereto, moving that mail to a junk folder or otherwise disposing of it. In this manner, while the sender's email may not be blocked, the ability of the sender to contact targeted recipients is limited for any subsequently-dispatched electronic messages. In one embodiment, one or more email messages delivered to a web-based email system inbox can be moved from the user's inbox to a junk email folder, in response to recognizing the sender of the email message(s) as an origin of unsolicited messages. Thus, the email is "time traveled" by going back in time and moving the messages that were delivered to the user's inbox to the junk folder. In one embodiment, only mail delivered to a user's inbox since the user last logged in to his/her email system are time traveled, although this need not be the case. In this manner, mail is not moved once the user would have an opportunity to view it in a certain place (e.g. inbox), as it could be confusing to a user to move email after it had been noted in a particular place. In another embodiment, mail moved into a local email client is also not time traveled once it has indeed been imported into the local email client. Again, the principles described herein are equally applicable to time traveling any mail, whether already noted in a location by a user or not, but one embodiment involves time traveling only the email that has not yet been presented to the user in a place different than where it would otherwise be moved to.

Various other actions may instead, or additionally, be implemented in response to recognizing a sender as an origin of unsolicited messages. Those depicted in FIG. 2 are presented for purposes of illustration. Unsolicited messages from a sender can be deleted or moved, the sender may be blocked or warned, and/or any other desired action may be used. In one embodiment, further emails from the sender to the targeted recipients are in some way restricted, whether by blocking, moving, deleting, or otherwise affect the disposition of the email.

Figure 3:
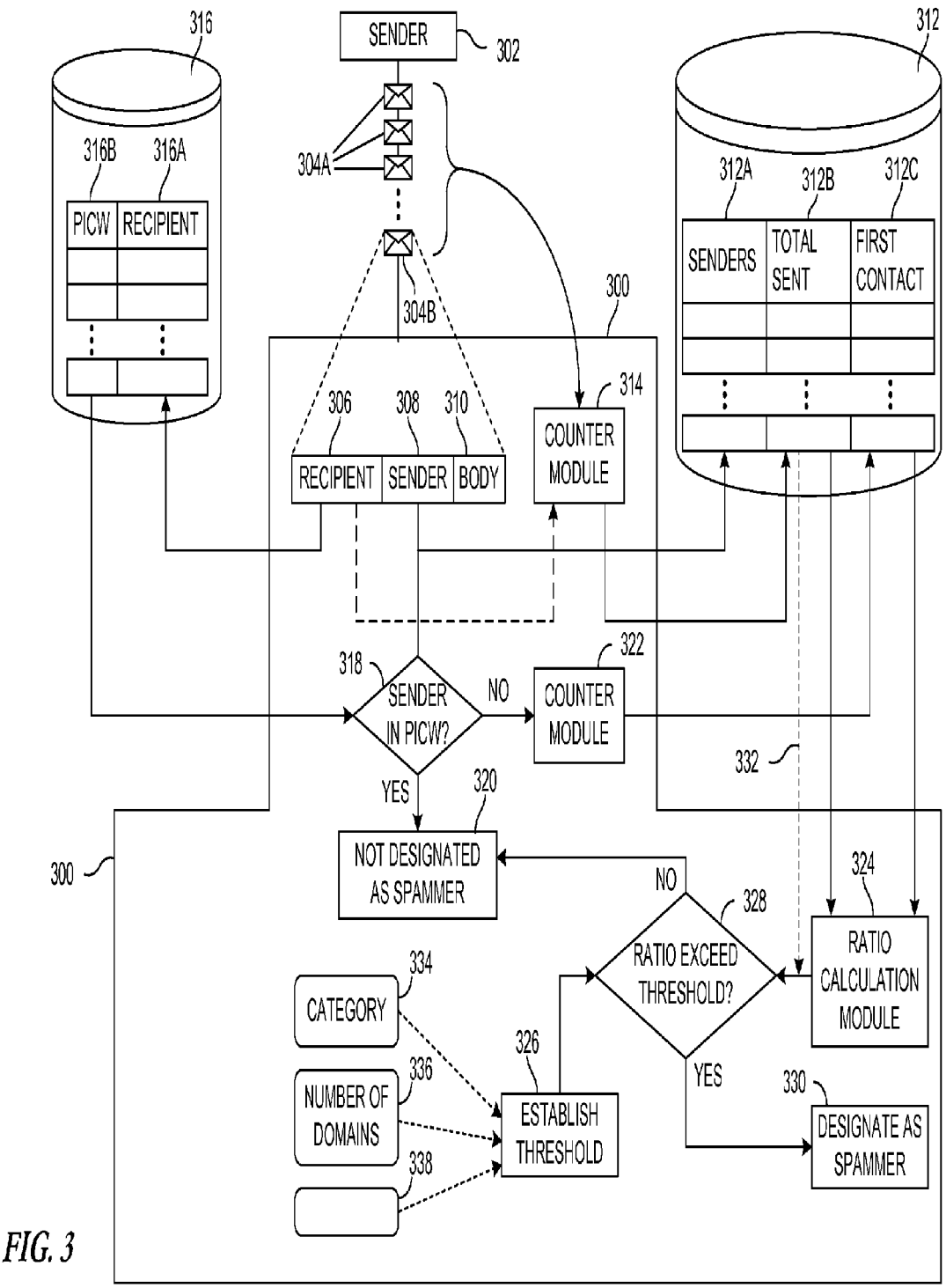
FIG. 3 is a block diagram depicting a representative message analysis module.

FIG. 3 is a block diagram depicting another representative message analysis module 300 that may be separately provided, provided with an aggregation server or mail server, etc. In the example of FIG. 3, a sender 302 represents any particular sender of emails (or other messages). The sender may be identified in any fashion, such as by way of an email "from" field, domain name, IP address, etc. Assuming in FIG. 3 that the messages at issue are emails, the emails 304A, 304B may each include at least recipient identification 306 of at least one recipient, a sender identification 308 of the sender, and a body 310. A database or other storage 312 can track sender identification 308 in a senders field 312A. Thus, a database record or other affiliated stored information may be stored for each received email 304, 306.

In one embodiment, the total number of emails 304, 306 sent by each sender 302 is recorded. For example, each email originating from each sender, such as a sender identified by sender information 308, may be counted by a counter module 314. The total number of emails sent by the sender identified by the sender identification 308 can be stored in the database or other storage 312, such as shown by the total sent field 312B. Other manners of counting the total emails by a sender may also be used, such as in the case there the email 304B includes multiple recipient identifiers 306. In such case, the counter module 314 may count each recipient identifier 306 in the email 304B, which is tantamount to an equal number of individually addressed emails. Thus, in one embodiment, the total sent field 312B represents the number of addressees that the sender 302 (identified by the sender identification 308) has attempted to contact.

It should be noted that the counter module 314, or analogous counter modules), may track any reference value (s) for comparison to the number of first contact emails. Thus, the counter module 314 may track values different than the total number of emails identified as being sent by the sender 302. For example, the counter module 314 could track the number of emails sent in a particular time period, or in response to a trigger event, etc. Depending on the heuristics and desired reference, the counter module 314, timers, event counters, event trigger recognition devices, and/or other components may be used to determine the relevant heuristics for a given situation.

In the same or different database or storage 316, recipients 306 targeted in the incoming emails 304A, 304B are identified in a recipient field 316A. In one embodiment, each recipient or other user served by the message analysis module 300 is tracked in the database/storage 316, so that those who have communicated with each recipient can be tracked. This is depicted by the PICW field 316B. The PICW field 316B can store, for each recipient in the recipient field 316A, up to all of the persons, entities and/or other communicating sources and destinations that have previously communicated with that recipient. Thus, the PICW field 316B is updated in response to the arrival of new emails 304A, 304B, and in response to the respective recipient sending emails.

For a representative email 304B that has arrived at the message analysis module 300, the recipient(s) 306 identified as addressees in that email 304B are looked up in the database/storage 316. If that recipient is found in the recipient field 316A, the associated PICW in the PICW field 316B can be obtained. The obtained PICW from the PICW field 316B for that recipient identification 306 is compared to the sender identification 308, as depicted at decision block 318. Thus, in one embodiment, the decision block 318 may be implemented using a compare module such as software configured for execution on a processor(s). The comparison may compare each of the entries in the PICW field 316B for that particular recipient 316A to the sender identified by one or more identifying attributes in the sender identification 308. If the sender is already part of that recipient's PICW, then the sender identified by the sender identification 308 will not be designated as an origin of unsolicited email, as depicted at block 320.

If, however, the sender identified by the sender identification 308 is not part of the recipient's PICW as determined at block 318, the email from that sender identification 308 to that recipient identification 306 is deemed a first contact between these parties. A counter module 322 can count such first contacts between such parties. The counter module 322 may be implemented in hardware, or software executable via a processor(s) to count the number of first contact emails sent by the sender identified by the sender identification 308. This will occur for each sender 302 of emails arriving at the mail server, mail transfer agent, or other entity incorporating a message analysis module 300 as described herein. The "count" obtained for each sender at the counter module 322 may store the running count of first contacts in a first contact field 312C of a database record or other storage entry of the database/storage 312 for the respective sender in the senders field 312A. In one embodiment, each record of a database 312 therefore identifies each sender in the senders field 312A, along with the respective total emails sent in the total sent field 312B, and the number of emails that are deemed "first contacts" in the first contact field 312C.

At any time the email senders identified in the senders field 312A may be checked to make a determination whether the stored senders are to be considered origins of unsolicited emails. This can be triggered randomly, periodically, based on trigger events, and/or in connection with other events and/or times. For example, in one embodiment involving a triggering event, a calculation of the ratio of the first contacts relative to the total emails sent by a sender may be determined when either the number of total emails sent and/or the number of first contacts changes. More particularly, a calculation of the ratio of the first contacts in the first contact field 312C relative to the total emails sent from the total sent field 312B for the respective sender in the senders field 312A may be determined at the time that the total sent field 312B and/or first contact field 312C is updated.

In one embodiment, the ratio calculation module 324 determines the ratio of first contact emails sent relative to the total number of emails sent for each sender being tracked. In one embodiment, all senders are tracked, although this need not be the case, as any desired subset of senders may be tracked, including specific senders, a random sampling of senders, etc. Nevertheless, in one embodiment, all senders are tracked to enable identification of each sender whose first contact emails are proportionally high enough to enable confirmation of the respective sender as an origin of unsolicited email.

The ratio calculation module 324, as with other modules described herein, may be implemented in hardware, firmware, or software. In one embodiment, the ratio calculation module 324 is implemented in software executable by a processor(s) to compare the number of first contacts counted by the counter module 322 and stored in the first contact field 312C for the respective sender in senders field 312A, to the total emails sent as counted by the counter module 314 and stored in the total sent field 312B. In one embodiment, this "comparison" may be implemented via a mathematical division of the first contacts divided by the total emails sent, providing a quotient that is a ratio or percentage of first contact emails relative to the total emails sent by each respective sender.

A threshold may be established as depicted at block 326. In one embodiment, the threshold is a static value, such as 90%, or 80%, etc. In such a case, if the number of first contact emails sent by a particular sender exceeds the static threshold as determined at decision block 328, that sender can be designated as an origin of unsolicited emails as depicted at block 330.

In one embodiment, the total number of emails sent, as stored in the total sent field 312B, also involves a threshold such that the ratio determined at block 328 will not designate a sender as a source of unsolicited email unless the total number of emails sent by that sender exceeds a particular number. This is depicted by dashed line 332, which represents the inclusion of the total emails sent from the total sent field 312B as a factor in the decision at block 328. For example, it may be established that to designate a sender as a spammer at block 330, the ratio calculated by the ratio calculation module 324 is greater than 90%, and the total number of emails sent by that sender exceeds 10,000.

The threshold may be established in other manners. The threshold may not be entirely static, but may be static for certain categories of senders, for a particular time, etc. For example, a category 334 of the sender identified in the sender identification 308 can be used to set or adjust the threshold, whereby the threshold is established at block 326 based on at least the category 334 of sender. While this is described in greater detail below, the category of sender may be determined based on factors such as, for example, the domain of the sender, the country of origin, different classes of senders, etc.

In another embodiment, the number of domains 336 used by a sender may impact where the threshold is established. For example, the number of domains used for an identifiable sender may also be tracked in the database/storage 312, and used in establishing the threshold at block 326 for such a sender. As a more particular example, if a sender uses more than one domain, or uses some threshold number of domains, the threshold for the requisite first contact-to-total emails ratio, and/or the total number of emails sent by that sender, may be reduced. In this manner, establishing the threshold at block 326 may be different for different senders, or different groups of senders, etc. Other factors represented by block 338 can alternatively or additionally be used in establishing the threshold for designating a sender as a source of unsolicited email.

It should be recognized that the example of FIG. 3 involves determining a ratio of first contact-to-total sent email based on an identification of the sender. This identification may be made based on any one or more of the sender's single IP address, a range of IP addresses, "from" field, domain, registered entity, etc. In one embodiment, the sender identification 308 is based on the sender's IP address, although the "from" field in the email 304B or other sender identifiers may be alternatively or additionally used. Further, the first contact determination at block 318 may be made for recipient information from the "from" field of the email 304B, although it could be based on other identifier(s) of the email recipient such as recipient IP address or the like.

Figure 4A:
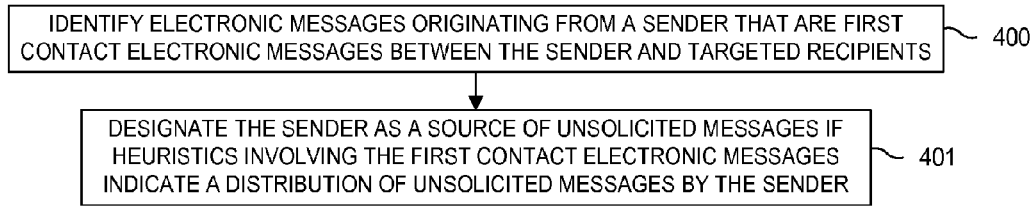
FIGS. 4A and 4B are flow diagrams illustrating representative manner for identifying senders of electronic messages as sources of unsolicited messages.

FIG. 4A is a flow diagram illustrating a general technique for providing the capability to identify certain senders of electronic messages as sources of unsolicited messages. Block 400 of this representative technique involves identifying electronic messages originating from a sender that are first contact electronic messages between the sender and targeted recipients. As shown at block 401, the sender of the electronic messages may be designated as a source of unsolicited messages if heuristics involving the first contact electronic messages indicate a distribution of unsolicited messages by the sender.

Figure 4B:
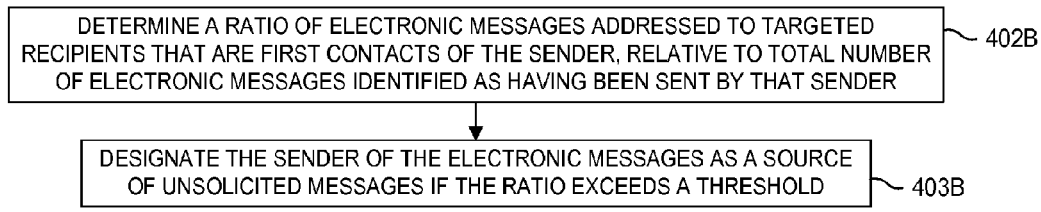

FIG. 4B is a flow diagram illustrating a representative manner for identifying senders of electronic messages as sources of unsolicited messages using a ratio of first contact messages relative to the total messages known to be sent by each respective sender. Representative block 402B depicts an embodiment to determine a ratio of electronic messages addressed to targeted recipients that are first contacts of the sender, relative to a total number of electronic messages identified as having been sent by that sender. For example, electronic messages such as email may be identified as having been sent by a particular sender at a mail server or other mail transfer agent. In one embodiment, electronic messages sent by the sender that do not pass through the mail server or other mail transfer agent are not considered as part of the total number of electronic messages, although collaboration with other electronic messaging systems may be implemented to enable a larger reach.

The ratio determined at block 402B may then be used to determine whether or not the sender of electronic messages corresponding to the determined ratio is a source of unsolicited electronic messages. More particularly, block 403B illustrates an embodiment where the sender of the electronic messages is designated as a source of unsolicited messages if the ratio determined at block 402B exceeds some threshold. In this manner, actions may be taken relative to further electronic communications by such a source of unsolicited messages, to mitigate what has been deemed as junk mail or "spam."

Figure 4C:
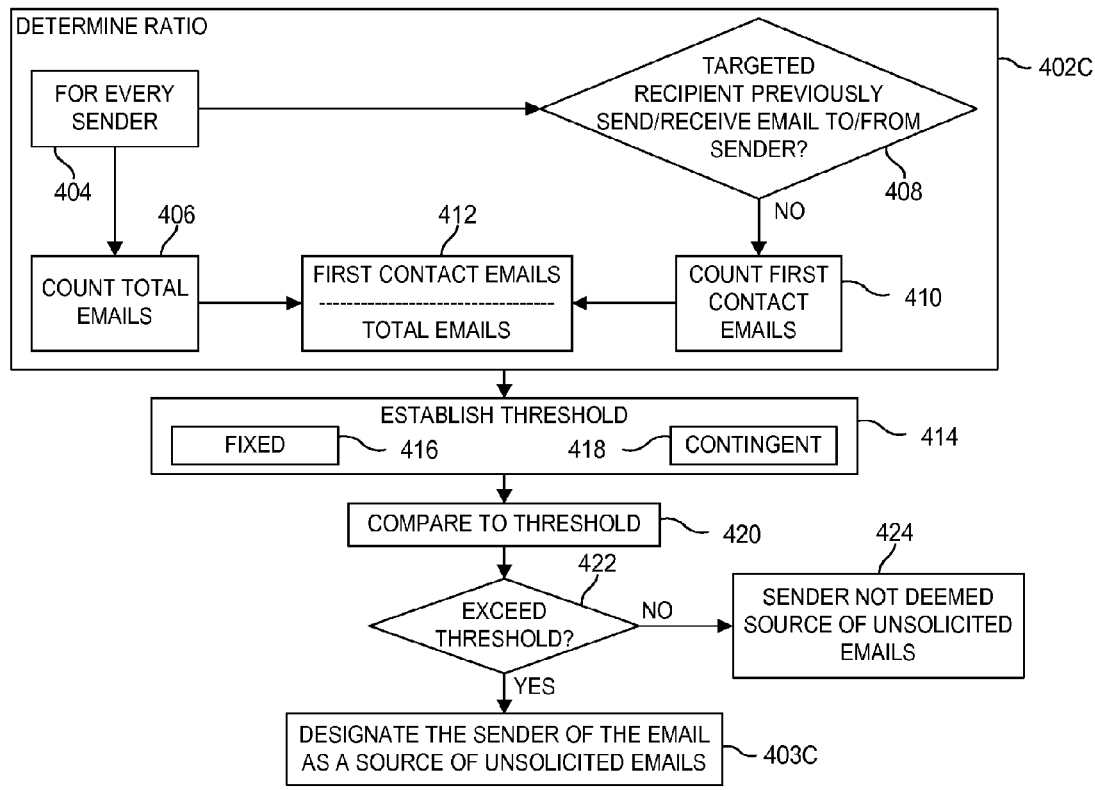
FIG. 4C is a flow diagram illustrating representative variations in the identification of message senders as sources of unsolicited messages.

FIG. 4C is a flow diagram illustrating representative variations in the identification of message senders as sources of unsolicited messages. In this example, the electronic messages are assumed to be emails. Block 402C involves determining a ratio of first contact emails from a sender versus a total number of emails from that sender. The example of block 400B illustrates one representative manner in which such ratio may be determined. This example assumes that such a ratio is determined for every sender recognized by the monitoring system, as depicted at block 404. In this example, block 406 illustrates that the total number of emails sent by each sender is counted. As previously noted, this may involve counting each email sent by a sender, each sender/recipient combination, etc. for example, if a sender delivers an email to one hundred different recipients, one embodiment involves considering that multi-recipient email as one hundred separate emails. In other embodiments, each distinct email is what is counted towards the total number of emails.

If the targeted recipient(s) has not previously sent/received to/from the sender as determined at block 408, the current email will be deemed a first contact email, which will be counted as shown at block 410 for each sender. In one embodiment, the first contact is determined on a recipient basis, such that a single email to one hundred different recipients that have never previously communicated with the sender will be counted as one hundred first contact emails. The ratio of the first contact emails to the total emails may be determined as shown at block 412.

The calculated ratio determined at block 412 may be compared to a threshold value as depicted at block 420. In one embodiment, this threshold is established as shown at block 414. The threshold may be fixed as shown at block 416, for example, such that the comparison at block 420 is compared to a previously-established value. In other embodiments, the threshold is not fixed, but rather is contingent upon one or more factors as depicted at block 418. In any case, the ratio determined at block 412 is compared to the threshold determined at block 414, and it is determined at block 422 whether the calculated ratio of block 412 exceeds the established threshold. If not, block 124 illustrates that the sender will not be deemed a source of unsolicited emails. Otherwise, if the ratio of block 412 exceeds the established threshold, the sender of the emails will be designated as a source of unsolicited emails as depicted at block 403C.

Figure 5:
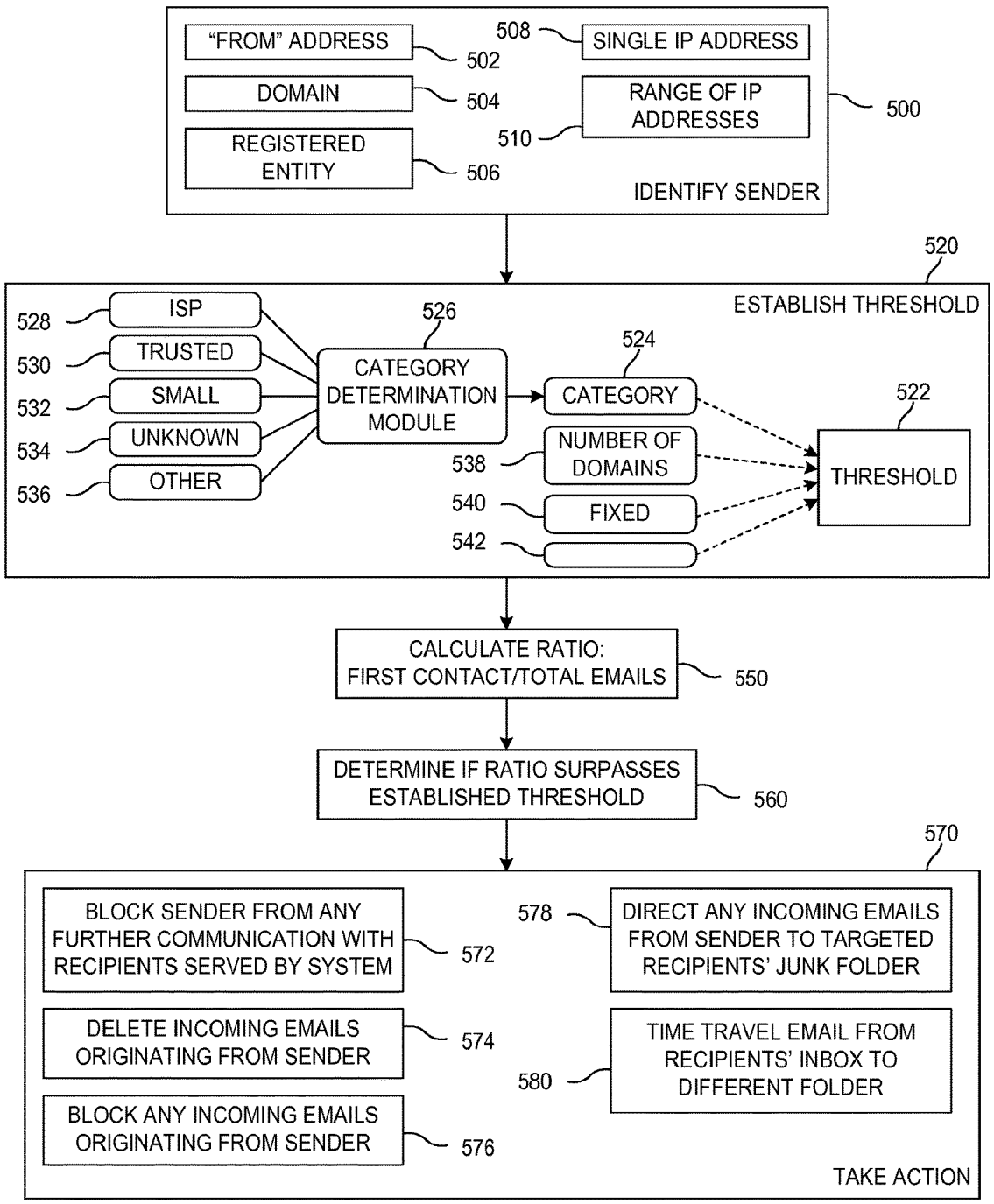
FIG. 5 is a flow diagram illustrating representative variations of particular features described herein.

FIG. 5 is a flow diagram illustrating representative variations of particular features described herein. The depicted variations are provided for purposes of example, as many variations may be used in connection with the description that are not depicted in FIG. 5. The illustrated embodiment of FIG. 5 depicts various representative manners at block 500 in which the sender of emails and other electronic messages may be identified. Email is assumed for purposes of this example, although the principles of FIG. 5 may be applied to other electronic messages.

As shown at block 500, a sender may be identified by what is listed in the "from" address 502 of the email. In one embodiment, the first contact determination is made using the "from" address of the sender, although other sender identification may be used. The "from" address 502 may therefore be used as the sole criterion, or one of a plurality of criteria, for identifying the sender. In another embodiment, the domain 504 of the sender's address may be used to identify the sender. An identification of a registered entity 506 in the sender's address can be used to identify the sender, such as autonomous system (ASN) prefixes, WHOIS protocol, etc. The sender's interact protocol (IP) address 508 may be used to identify the sender, as may a range of IP addresses 510. For example, classless inter-domain routing (CIDR) addresses/prefixes may be used to identify a sender in a range of addresses. These and other manners may be used to identify email senders, which can then be tracked to determine whether they are sending unsolicited emails.

At some point, a threshold 522 value is established as shown at block 520. The threshold 522 may be used as a reference for determining whether a sender is deemed a source of unsolicited emails. In one embodiment, the threshold 522 is contingent upon at least a category 524 of sender. For example, the entire analysis of whether a sender is a source of unsolicited emails, or the threshold 522 value, may be contingent on the specific class(es) of sender under consideration. Information in the sender's address, email header, metadata and/or other information may be used to determine a class of sender that can be used to establish a category 524 to possibly impact the threshold 522. For example, an interact service provider (ISP) 528 or trusted providers 530 may reference email from certain email providers that may be afforded some different treatment relative to other classes. Small 532 senders having lower volumes may also be considered as a class, as well as unknown addresses or domains 534. Small or unknown addresses/domains, as noted at blocks 532, 534, may be afforded some different treatment relative to other classes. These and/or other 536 classes may be utilized. In one embodiment, a category determination module 526 can determine which of the available classes a sender belongs, and the resulting category 524 may then, if desired, be used to adjust the threshold 522. In other embodiments, the class or category 524 may determine whether or not to even perform the first contact analysis or take any action. Thus, in one embodiment, the threshold for restricting further emails from a sender decreases as a predetermined level of trust in the category of the sender decreases.

Another factor that may impact the threshold 522 is the number of domains 538 the sender used as part of the first contact mailing. For example, sources of unsolicited emails may use multiple domains, and a large percentage of the email may be first contact email. Thus, in one embodiment, the number of domains 538 may impact the ratio or percentage that triggers the "spammer" label for a sender. In a particular embodiment, the number of domains 538, category 524 and/or other 542 factors may impact the threshold 522 on a sliding scale, whether proportionally impacting the threshold 522 or not. For example, with a single domain, a triggering ratio of first contact to total emails sent may be 90%, where with five or ten domains the ratio may be reduced such as to 70%, 80%, or something less than the single-domain percentage of 90%. Further, as previously noted, the threshold 522 may be fixed 540, whether temporarily or permanently fixed 540.

A ratio or other relative indication is calculated as shown at block 550, which may be calculated by comparing the number of first contact emails sent by a sender to the total emails sent by the sender. In one embodiment, the first contact emails may be divided by the total emails sent to arrive at a relative number, percentage or ratio, which can be easily compared to a fixed or adjustable threshold 522. It is determined at block 560 whether the calculated ratio surpasses the established threshold. It should be recognized that to exceed, surpass, or be greater than an established threshold may involve being greater than or equal to that threshold. Thus, if a threshold is set to 0.90, any value of 0.90 or above may be deemed as satisfying the threshold. Alternatively, a "stated" threshold of 0.90 may actually be a threshold of just under 0.90 (e.g. 0.89+), whereby surpassing the "actual" threshold of 0.89 (and reaching 0.90) causes the triggering event. Thus, the actual threshold value, and whether it is inclusive of its stated value or not, is not of particular import to the principles described herein.

If it is determined that the ratio surpasses the established threshold at block 560, some action may be taken as depicted by block 570. FIG. 5 illustrates numerous, representative examples of actions that might be taken. It should be recognized, however, that such representative examples do not represent an exhaustive list, but rather are provided to facilitate an understanding of how actions might be taken.

As shown at block 572, the sender may be blocked from any further communication with recipients served by the system. For example, a mail server or other mail transfer agent may be notified to block emails from that sender's IP address and/or other sender identification. In such case, the targeted recipients served by that system would no longer receive email from that sender. At blocks 574 and 576, incoming emails originating from the sender may be deleted or otherwise blocked. In another example shown at block 578, incoming emails from that sender may be directed to the targeted recipient's junk folder or other location, rather than to the recipient's inbox. Block 580 illustrates another embodiment, where mail that might have been posted to a recipient's email inbox (or other legitimate email folder) is time traveled to a different folder, such as a junk folder. This time traveling in essence moves the email from a legitimate email holding folder (e.g. inbox) to a folder that suggests the email is unsolicited or "spam" (e.g. junk email folder). These and other actions may be taken in response to determining the sender to be a source of unsolicited email.

Figure 6:
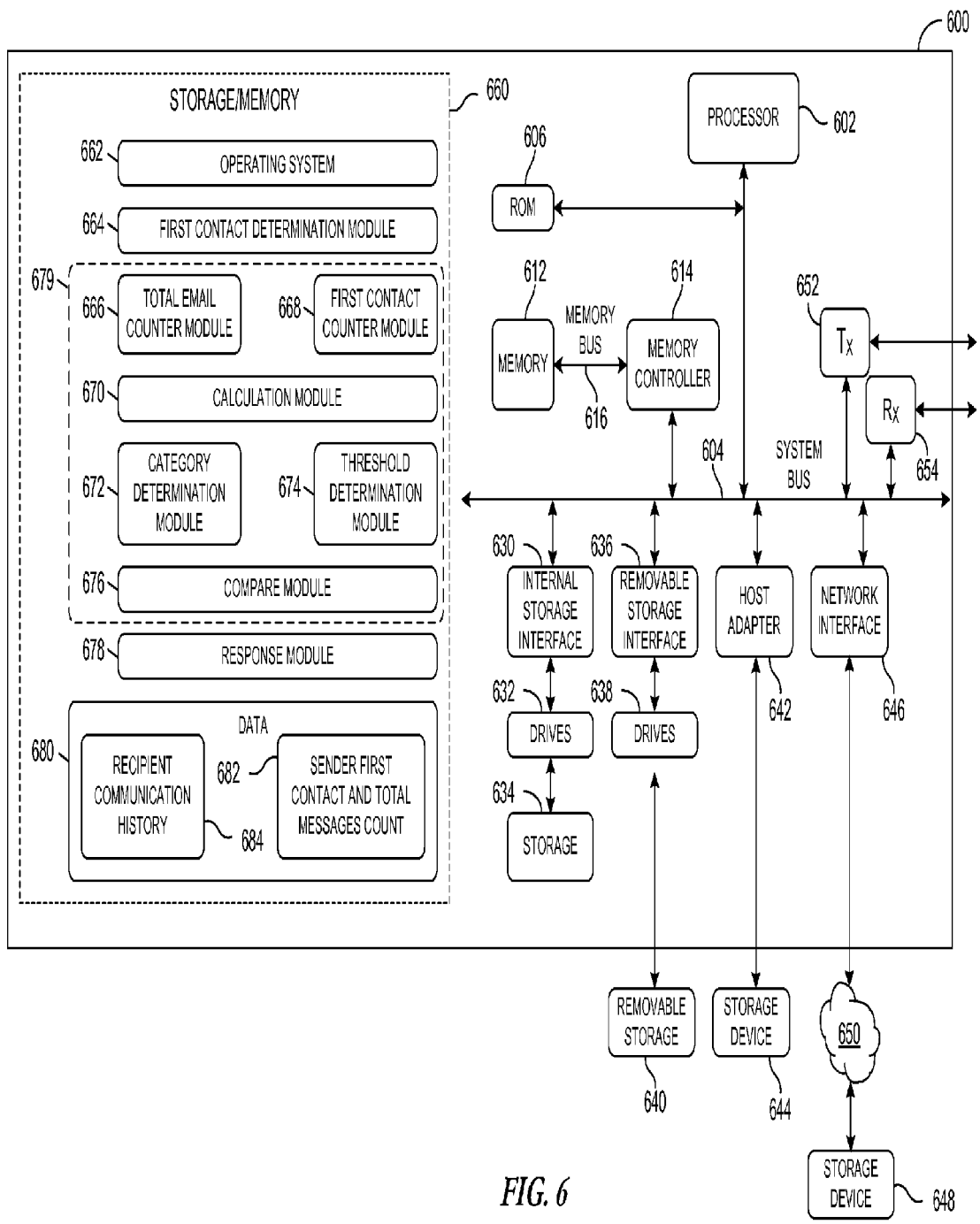
FIG. 6 depicts a representative computing system in which the principles described herein may be implemented.

FIG. 6 depicts a representative computing apparatus or device 600 in which the principles described herein may be implemented. The representative computing device 600 can represent any one or more computing devices in which emails and/or other electronic messages may be received and processed. For example, the computing device 600 may represent an aggregation server 214 as identified in FIG. 2, or a mail transfer agent 204 of FIG. 2 where the functions of the aggregation server 214 are integrated therein. Thus, the computing device 600 represents any computing server, desktop computing device, laptop or other portable computing device, smart phone or other hand-held device, personal digital assistant, etc. The computing environment described in connection with FIG. 6 is described for purposes of example, as the structural and operational disclosure for identifying and/or mitigating first contact spam as described herein is applicable in any computing environment in which email or other electronic messages may be received, and processing functionality is provided to carry out features described herein. It should also be noted that the computing arrangement of FIG. 6 may, in some embodiments, be distributed across multiple devices (e.g. mail server, aggregation server, storage, etc.).

The representative computing device 600 may include a processor 602 coupled to numerous modules via a system bus 604. The depicted system bus 604 represents any type of bus structure(s) that may be directly or indirectly coupled to the various components and modules of the computing environment. A read only memory (ROM) 606 may be provided to store firmware used by the processor 602. The ROM 606 represents any type of read-only memory, such as programmable ROM (PROM), erasable PROM (EPROM), or the like.

The host or system bus 604 may be coupled to a memory controller 614, which in turn is coupled to the memory 612 via a memory bus 616. The techniques and embodiments described herein may be implemented in software that is stored in any storage, including volatile storage such as memory 612 and/or non-volatile storage devices. FIG. 6 illustrates various other representative storage devices in which applications, modules, data and other information may be temporarily or permanently stored. For example, the system bus 604 may be coupled to an internal storage interface 630, which can be coupled to a drive(s) 632 such as a hard drive. Storage 634 is associated with or otherwise operable with the drives. Examples of such storage include hard disks and other magnetic or optical media, flash memory and other solid-state devices, etc. The internal storage interface 630 may utilize any type of volatile or non-volatile storage.

Similarly, an interface 636 for removable media may also be coupled to the bus 604. Drives 638 may be coupled to the removable storage interface 636 to accept and act on removable storage 640 such as, for example, floppy disks, compact-disk read-only memories (CD-ROMs), digital versatile discs (DVDs) and other optical disks or storage, subscriber identity modules (SIMs), wireless identification modules (WIMs), memory cards, flash memory, external hard disks, etc. In some cases, a host adaptor 642 may be provided to access external storage 644. For example, the host adaptor 642 may interface with external storage devices via small computer system interface (SCSI), Fibre Channel, serial advanced technology attachment (SATA) or eSATA, and/or other analogous interfaces capable of connecting to external storage 644. By way of a network interface 646, still other remote storage may be accessible to the computing device 600. For example, wired and wireless transceivers associated with the network interface 646 enable communications with storage devices 648 through one or more networks 650. Storage devices 648 may represent discrete storage devices, or storage associated with another computing system, server, etc. (e.g. store 208 of FIG. 2). Communications with remote storage devices and systems may be accomplished via wired local area networks (LANs), wireless LANs, and/or larger networks including global area networks (GANs) such as the Internet.

The computing device 600 may transmit and/or receive information from external sources, such as to send and/or receive electronic messages. Communications between the device 600 and other devices can be effected by direct wiring, peer-to-peer networks, local infrastructure-based networks (e.g., wired and/or wireless local area networks), off-site networks such as metropolitan area networks and other wide area networks, global area networks, etc. A transmitter 652 and receiver 654 are shown in FIG. 6 to depict a representative computing device's structural ability to transmit and/or receive electronic messages or other data in any of these or other communication methodologies. The transmitter 652 and/or receiver 654 devices may be stand-alone components, may be integrated as a transceiver(s), may be integrated into a different communication devices such as the network interface 646, etc.

The memory 612 and/or storage 634, 640, 644, 648 may be used to store programs and data used in connection with the various techniques for identifying/mitigating first contact spam as described herein. The storage/memory 660 represents what may be stored in any one or more of the memory 612, storage 634, 640, 644, 648, and/or other data retention devices. In one embodiment, the representative device's 600 storage/memory 660 may include an operating system 662, and numerous operational modules executable by the processor 602 for carrying out technical operations described herein. These operational modules may be executed as part of one or more applications operating on top of the operating system 662, or one or more modules may be implemented elsewhere such as part of the operating system 662 itself. It should be noted that while modules in FIG. 6 may be described in terms of email, they are equally applicable to other electronic messages.

For example, a first contact determination module 664 may be provided to determine whether an email(s) or other electronic message(s) from a sender is a first contact to each targeted recipient of the email/message. The first contact determination module 664 may, for example, be implemented in software executable via the processor(s) 602. In one embodiment, the first contact determination module 664 examines the recipient communication history 684 which is depicted as stored data 680. If the recipient communication history 684 does not show any prior communication with the particular sender, it may be determined to be a first contact by that sender to that targeted recipient. Thus, the first contact determination module 664 is capable of determining a first contact email/message if the sender is not part of the targeted recipient's previously-established PICW, shown in FIG. 6 as the recipient communication history 684.

The storage/memory 660 may also include a total email counter module 666 and a first contact counter module 668, which respectively count the total emails from a sender to the tracked recipients, and the number of those emails that are first contacts with the tracked recipients. Based on these results which may be stored as the sender first contact and total messages count 682, the calculation module 670 (serving as a ratio calculation module in this example) can derive a value(s) that can represent the quantity of first contact emails relative to the total number of emails sent by that sender. For example, the value may be a ratio of the first contact emails to the total emails. It should be recognized, however, that the value may be any representation of the relative counts, such as a ratio of the total emails to the first contact emails, or other mathematical formula using the count values. The threshold determination module 674 determines the threshold, whether a fixed value, modifiable value, etc. In one embodiment where the threshold is fixed, the threshold determination module may merely represent a stored value (e.g. 0.90). In other embodiments, at least classes or categories of senders may impact the determination of the threshold, in which case a category determination module 672 may be provided to examine sender identification information and determine which of a plurality of categories the sender's email may fall into. Based on such determined category, the threshold determination module 674 can adjust the threshold. The number of domains and/or other factors may instead, or additionally, impact the threshold value.

The calculated ratio from the calculation module 670 and the threshold from the threshold determination module 674 can be compared by the compare module 676 to determine whether the ratio meets/exceeds the threshold value. If the threshold is exceeded, the response module 678 can be invoked. The response module 678 may take some action in response to recognizing that the sender has sent a proportionally large (or at least reaching some fixed or calculated value) number of emails to the recipients being tracked. For example, the response module 678 may block the sender from further communications with recipients served by the system. This may be accomplished in various manners, such as sending a notification to the mail server(s) or other mail transfer agent(s) to stop receiving emails/messages from the identified sender. The response module 678 may delete or block incoming emails from that sender, which again may be facilitated with the assistance of a mail server or mail transfer agent. Other notifications to direct incoming messages to a particular destination (e.g. junk folder) or to time travel certain received, email may provided. These are representative of the types of actions that may be taken by the response module 678.

The modules 666-676 represent one embodiment where a ratio of first contact emails to the total emails identified as sent by a sender is determined. However, as previously noted, such a ratio is an example of the type of heuristics that may be used to identify senders as sources of spam. Other heuristics may alternatively or additionally used, such as detecting changes in such ratios, detecting abrupt changes in incoming message volumes, detecting changes in first contact message volumes over time, etc. Thresholds may be adjusted based on the type of heuristics involved, as well as other factors such as those described in connection with FIG. 5. Thus, modules such as modules 666-676 represent one exemplary embodiment of a heuristics module 679 that more generally depicts how first contact messages may be used to identify sources of unsolicited electronic messages.

As previously noted, the representative computing device 600 in FIG. 6 is provided for purposes of example, as any computing device having processing capabilities can carry out the functions described herein using the teachings described herein. Any one or more of these modules may be implemented in programs or applications, such as email clients or web-based email systems, or other messaging systems installed locally on a user's computing device or on a server(s) capable of communicating with the user's computing device. These modules and data are depicted for purposes of illustration, and do not represent an exhaustive list. Any programs or data described or utilized in connection with the description provided herein may be associated with the storage/memory 660.

As demonstrated in the foregoing examples, embodiments described herein facilitate identification and mitigation of first contact spam, as well as other features. In various embodiments, methods are described that can be executed on a computing device(s), such as by providing software modules that are executable via a processor (which includes a physical processor and/or local processor, controller, etc.). The methods may also be stored on computer-readable media that can be accessed and read by the processor and/or circuitry that prepares the information for processing via the processor. For example, the computer-readable media may include any digital storage technology, including memory 612, storage 634, 640, 644, 648, any other volatile or non-volatile storage, etc.

Any resulting program(s) implementing features described herein may include computer-readable program code embodied within one or more computer-usable media, thereby resulting in computer-readable media enabling storage of executable functions described herein to be performed. As such, terms such as "computer-readable medium," "computer program product," computer-readable storage, computer-readable media or analogous terminology as used herein are intended to encompass a computer program(s) existent temporarily or permanently on any computer-usable medium.

Having instructions stored on computer-readable media as described herein is distinguishable from instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:

1. A method performed on a computing device, the method comprising:
   receiving, by the computing device via a network, electronic messages originating from a source;
   determining, by the computing device, that the received electronic messages represent first contacts by the source with designated recipients of the received electronic messages based on communication histories of the designated recipients that do not show any prior communications with the source;
   identifying, by the computing device based on a quantity of the first contacts, the received electronic messages as first-contact electronic messages;
   designating, by the computing device based on the identifying, the source as a source of unsolicited messages; and
   blocking, by the computing device based on the designating, incoming electronic messages from the designated source.

2. The method of claim 1 where the identifying is further based on a change in the quantity of the first contacts exceeding a threshold.

3. The method of claim 2 where the threshold is contingent upon a classification of the source.

4. The method of claim 1 where the first-contact electronic messages are sent from the source to the designated recipients with which the source has no pre-existing relationship.

5. The method of claim 1 where the first-contact electronic messages comprise electronic mail.

6. The method of claim 1 where the blocking includes deleting the incoming electronic messages or moving the incoming electronic messages.

7. The method of claim 1 where the source is identified based on at least one network address.

8. A computing device comprising:
   a processor;
   memory coupled to the processor;
   a network interface via which the computing device is configured to receive, via a network, electronic messages originating from a source;
   a heuristics module via which the computing device is configured to:
      determine that the received electronic messages represent first contacts by the source with designated recipients of the received electronic messages based on communication histories of the designated recipients that do not show any prior communications with the source;
      identify the received electronic messages as first-contact electronic messages based on a quantity of the first contacts;
      designate the source as a source of unsolicited messages based on the identified first-contact electronic messages; and
   the computing device configured to block, based on the source being designated the source of the unsolicited messages, incoming electronic messages from the designated source of the unsolicited messages.

9. The computing device of claim 8 where the received electronic messages are identified as first-contact electronic messages based on a change in the quantity of the first contacts exceeding a threshold.

10. The computing device of claim 9 where the threshold is contingent upon a classification of the source.

11. The computing device of claim 8 where the first-contact electronic messages are sent from the source to the designated recipients with which the source has no pre-existing relationship.

12. The computing device of claim 8 where the first-contact electronic messages comprise electronic mail.

13. The computing device of claim 8 where the blocked incoming electronic messages are deleted or moved.

14. The computing device of claim 8 where the source is identified based on at least one network address.

15. At least one computer-readable medium that comprises instructions that, based on execution by a computing device, configure the computing device to perform actions comprising:
   receiving, by the computing device via a network, electronic messages originating from a source;
   determining, by the computing device, that the received electronic messages represent first contacts by the source with designated recipients of the received electronic messages based on communication histories of the designated recipients that do not show any prior communications with the source;
   identifying, by the computing device based on a quantity of the first contacts the received electronic messages as first-contact electronic messages;
   designating, by the computing device based on the identifying, the source as a source of unsolicited messages; and
   blocking, by the computing device based on the designating, incoming electronic messages from the designated source.

16. The at least one computer-readable medium of claim 15 where the identifying is based on a change in the quantity of the first contacts exceeding a threshold.

17. The at least one computer-readable medium of claim 16 where the threshold is contingent upon a classification of the source.

18. The at least one computer-readable medium of claim 15 where the first-contact electronic messages are sent from the source to the designated recipients with which the sender has no pre-existing relationship.

19. The at least one computer-readable medium of claim 15 where the blocking includes deleting the incoming electronic messages or moving the incoming electronic messages.

20. The at least one computer-readable medium of claim 15 where the source is identified based on at least one network address, or where the first-contact electronic messages comprise electronic mail.

* * * * *